United States Patent [19]
Kobayashi et al.

[11] Patent Number: 5,897,981
[45] Date of Patent: Apr. 27, 1999

[54] COLOR FILTER FOR LIQUID CRYSTAL DISPLAYS

[75] Inventors: Kesanao Kobayashi, Haibara-gun; Takashi Fujita, Yamato; Naoyuki Tsujimura, Kawasaki; Naohisa Tohjoh, Yokohama, all of Japan

[73] Assignee: International Business Machines Corporation, Armonk, N.Y.

[21] Appl. No.: 08/870,542

[22] Filed: Jun. 6, 1997

[30]    Foreign Application Priority Data

Jun. 6, 1996 [JP] Japan ................................ 8-144341

[51] Int. Cl.[6] ........................... G02F 1/1335; G03F 7/028
[52] U.S. Cl. ............................................. 430/7; 430/288.1
[58] Field of Search ..................... 430/7, 288.1; 349/106

[56]    References Cited

U.S. PATENT DOCUMENTS 4,934,791  6/1990  Shimizu et al. ........................ 349/107
5,821,016  10/1998 Satoh et al. .................................. 430/7

FOREIGN PATENT DOCUMENTS 8-295808  11/1996  Japan .

*Primary Examiner*—John A. McPherson
*Attorney, Agent, or Firm*—George E. Grosser

[57]    ABSTRACT

A color filter for liquid crystal displays, has a red colored layer wherein a first red pigment where a 40%-transmittance wavelength at a short-wave end of a transmitted spectrum (short-wave 40%-transmittance wavelength) is in a range of 550 to 600 NM and a second red pigment where the short-wave 40%-transmittance wavelength is within 40 NM from the range of the first red pigment are mixed so that transmittance in a wavelength region of 450 to 500 NM is substantially 0%.

3 Claims, 3 Drawing Sheets

COLOR FILTER FOR LIQUID CRYSTAL DISPLAYS

Applicants claim the foreign priority benefits under 35 U.S.C. 119 based upon Japanese Application Serial No. 8.144341, which was filed Apr. 18, 1995. This Japanese application and its translation are incorporated into this application by reference.

FIELD OF THE INVENTION

The present invention relates to color filters for LCD display units which are used to display or receive color images, such as liquid crystal displays (LCDs) or CCD (charged-coupled device) cameras, and a photo polymeric composition. Specifically, the invention relates to a color filter for LCDs and a photo polymeric composition where transmittance characteristics have been improved.

BACKGROUND OF THE INVENTION

An LCD is a sort of optical shutter, and the optical shutter is created for each pixel. Light is controlled by the opening and closing of the optical shutter, whereby an image is displayed. If a color film through which visible light is transmitted is applied to each pixel, that color will be displayed when the shutter is open. If, as a color film, the red (R), green (G), and blue (B) which are the primaries of an additive color process are controlled as a single block, color display will become possible.

In the color filter for an LCD, usually R, G, and B pixels are regularly arrayed and the respective pixels are fringed with black matrixes. Each pixel can be made by various processes, such as a dyeing process of dyeing a pattern formed by photolithography, a printing process of printing a pattern directly on a transparent plate, an elecrodeposition process of providing a transparent electrode pattern on the surface of a transparent substrate and depositing coloring matter on the surface of the pattern together with vehicle, or a pigment dispersing process of forming a photo polymeric composition contained with a pigment into a pattern with photolithography.

Liquid crystal displays require light-resisting property and heat-resisting property from the viewpoint of stability and lifetime and, on the other hand, there is a demand for a color filter with high contrast and transparency from the viewpoint of power saving and display quality. The coloring matter of a color filter is gradually shifted from dyes to pigments in view of light-resisting property and heat-resisting property, and although a pigment has presently been used, the pigment is composed of particles, so the contrast and transparency that are obtained by light scattering are insufficient. Therefore, an attempt to solve the problem by reducing a particle diameter has been made and contrast has reached a nearly satisfactory level with a particle diameter of 0.1 to 0.05 micron.

For the transparency of a color filter, the matching between the emitted wavelength of a light source and the transmitted wavelength of a color filter is also important, apart from the particle diameter of a pigment. As a light source for liquid crystal displays, a cold-cathode tube called a 3-wavelength tube is usually used, and for example, the emitted wavelength of red is 610 nm.

Since Simple primary color a spectral characteristic desirable for such a color filter and it is known to obtain a desired spectral characteristic by mixing pigments. In particular this problem exists for the red pigment of a color filter.

As a red pigment, C. I. Pigment Red #177 and "primary yellow" (C. I. Pigment Yellow #139) are employed in. The spectral characteristics of those pigments are shown in FIG. 1. (C.I. refers to the Color Index published by The Society of Dyers and Colourist and the American Association of Texitle Chemists and Colorists).

As is evident in FIG. 1, C. I. Pigment Red #177 (indicated by (1) in FIG. 1), as it is, cannot be applied to a color filter because it has high transmittance near 380 to 530 nm and will degrade color purity (color closing to mulex as blue component mixes in red). Hence, primary yellow (C. I. Pigment Yellow #139 (indicated by (2) in FIG. 1)) where transmittance is relatively low in a wavelength region near 380 to 480 nm is mixed as a complementary color in order to enhance color purity. However, in this method the matching with a light source is insufficient and the mixed color will become dark red.

Also, for C. I. Pigment Red #244 (indicated by (3) in FIG. 1), the transmittance is higher with a wavelength of 610 nm but the y value of a chromaticity value is greater than a target value, and it is so-called red tinged strongly with yellow and is out of a usable range.

Hence it is desired to have a photo polymeric composition which can provide a color filter with an improved transmittance or transparency of a red region and an improved color purity.

SUMMARY OF THE INVENTION

The present invention to serve to improve the transmitted spectrum with respect to the emitted and transmitted spectra of the constituents of a TFT-LCD module, to realize the maximum transmittance at the panel display surface, and thereby enhance the display quality. More specifically, the present invention is to provide a color filter which improves the transmittance or transparency in the red portion of the spectrum and improves color purity.

The present invention by providing a color filter for liquid crystal displays, comprising a red colored layer wherein a first red pigment where a 40%-transmittance wavelength at a short-wave end of a transmitted spectrum (short-wave 40%-transmittance wavelength) is in a range of 550 to 600 nm and at least one second red pigment where the short-wave 40%-transmittance wavelength is within 40 nm from the range of the first red pigment are mixed so that transmittance in a wavelength region of 450 to 500 nm is substantially 0%.

The invention recognizes that a significant departure from the ideal filter characteristic for wavelengths below 450 nm may be present without impairing color purity because the TFT-LCD light source has insignificant power in that range to distort color purity.

The present invention is based on the fact that it has been found that if the transmittance in the range of 450 to 500 nm of the red colored layer of a color filter is made substantially 0%, for use with liquid crystal displays there would not be a problem regarding color purity even if transmittance were present in a range of less than 450 nm.

In the present invention, in order to achieve the aforementioned objectives, the inventors have made various investigations and experiments with respect to red pigments and found the following facts. That is, the matching with the light source of a liquid crystal display is improved by mixing together a first red pigment where a short-wave 40%-transmittance wavelength is in a range of 550 to 600 nm and at least one red pigment (a second red pigment) where the short-wave 40%-transmittance wavelength is within 40 nm from the range of the first red pigment, and consequently, the aforementioned objectives are achieved.

It is theoretically desirable that the transmittance in a wavelength of less than 450 nm be substantially 0, however, it is recognized according to the invention that even if that portion is not substantially 0, there will be little adverse influence on color purity.

That is, even if it were observed that the red colored layer had high transmittance at a wavelength region of less than 450 nm, the brightness of this region is difficult to sense with visual sensation, so there would be no problem. Furthermore, the light-emitting section (back light) of a TFT-LCD module member is generally constituted by a lamp called a 3-wavelength tube and does not emit light in a wavelength region of less than 450 nm. This fact will be found if the emitted spectrum (shown in FIG. 2) of the light-emitting section (back light) of a TFT-LCD module member is observed. Therefore, even if the aforementioned red colored layer has high transmittance at a wavelength of less than 450 nm, there will be no substantial influence in view of the fact that brightness is difficult to sense by the naked eye and also in view of the wavelength distribution of the light source (back light).

Here, the transmittance in a wavelength region of 450 to 500 nm being substantially 0% means that the average transmittance of the red colored layer in that wavelength region is less than 5%, preferably less than 1%. The transmittance in a wavelength region of less than 450 nm not being substantially 0% means that the average transmittance of the red colored layer in that wavelength region is more than 5%.

BRIEF DESCRIPTION OF THE DRAWINGS

The invention will be described in detail with reference to the Figures wherein.

DESCRIPTION OF A PREFERRED EMBODIMENT

Figure 1:
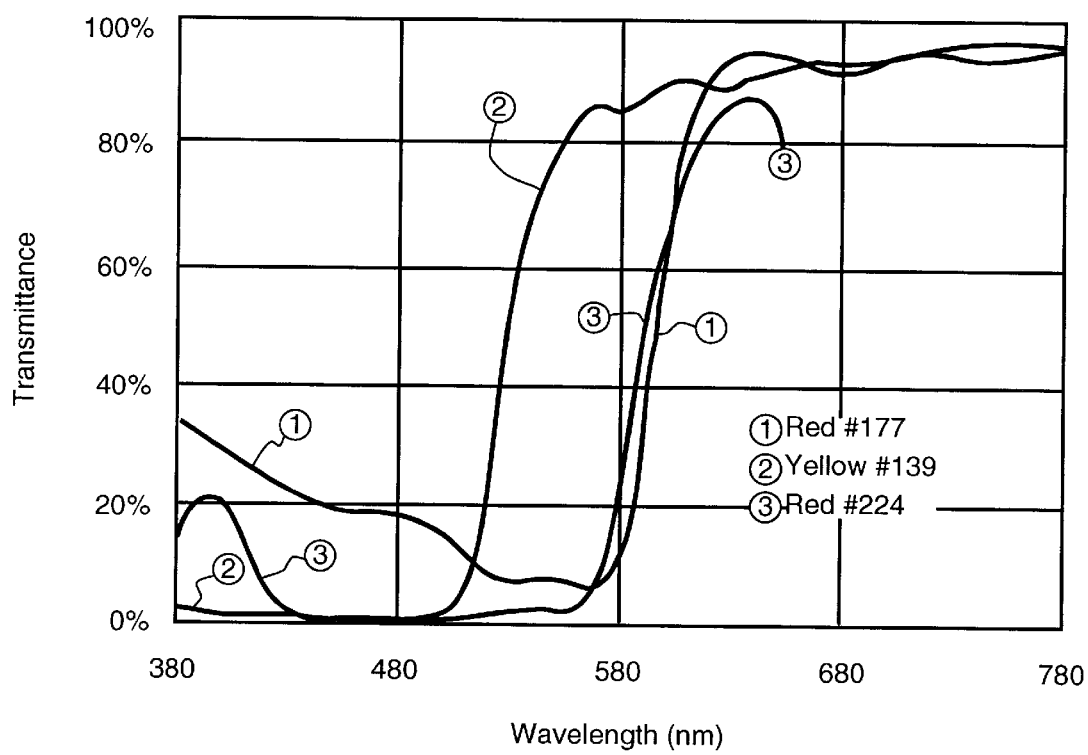
FIG. 1 is a diagram showing a graph representative of the spectral characteristic of selected pigments.
Figure 2:
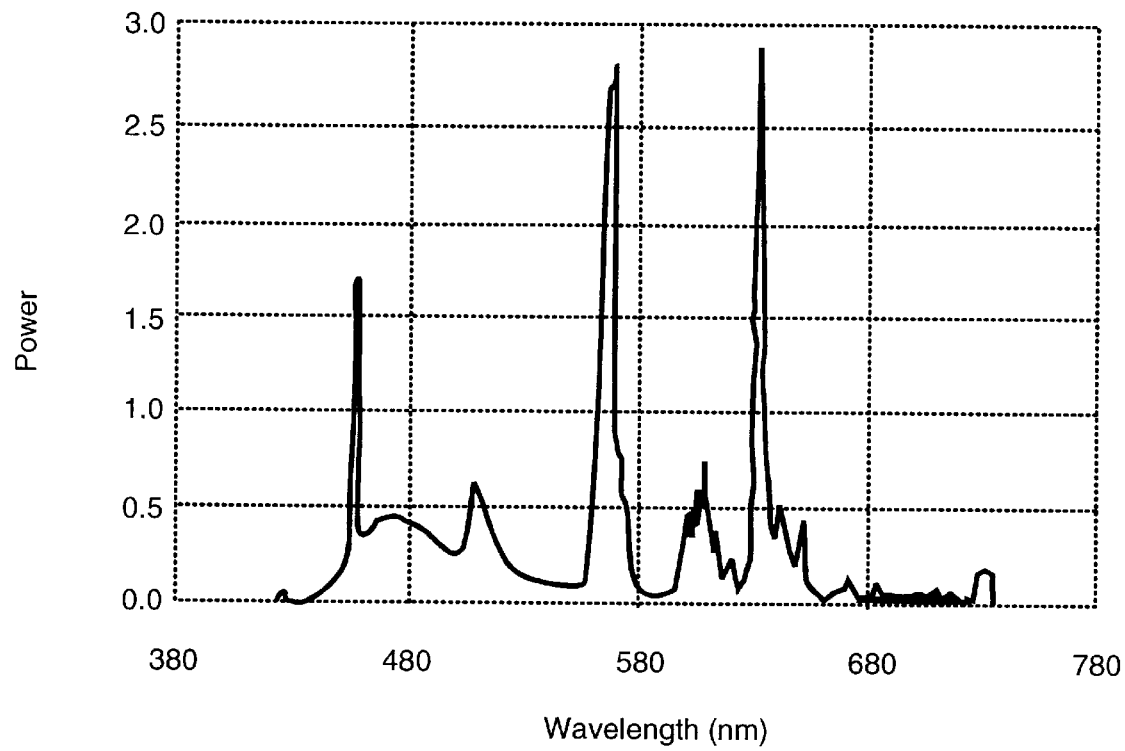
FIG. 2 is a diagram showing a graph representative of the emitted spectral power of a light-emitting section of a TFT-LCD module member.

In the present invention, the 40%-transmittance wavelength at the short-wave end of a transmitted spectrum (short-wave 40%-transmittance wavelength) is referred to as a wavelength which exhibits the transmittance of 40% on the side of a short wavelength in the transmitted pigment spectrum of a colored layer (with a film thickness of less than 10 $\mu$m) including a pigment formed on a glass plate, measured by a spectrophotometer.

C. I. Pigment Red #244 is taken as a first red pigment (hereinafter referred to as a "first red pigment") where the 40%-transmittance wavelength at the short-wave end of a transmitted spectrum (short-wave 40%-transmittance wavelength) is in a range of 550 to 600 nm, preferably 570 to 590 NM and more preferably 580 to 590 NM.

It is preferable that the ratio of the first red pigment is more than 30 weight % with respect to the entire red pigment, and it is more preferable that the ratio is between 45 weight % and 85 weight %. With this, a color filter with even more excellent transparency is obtainable.

C. I. Pigment Red #177 is taken as at least one red pigment (a second red pigment) where a short-wave 40%-transmittance wavelength is within 40 NM from that of the first red pigment, preferably a range of 580 to 610 NM and more preferably 590 to 600 NM.

It is preferable that the ratio of the second red pigment is between 15 weight % and 55 weight % with respect to the entire red pigment.

Two or more kinds of the first or second red pigments may be employed.

The present invention is an improvement in the red of a color filter, so any hue of green or blue can be employed. A color filter can be created, for example, by a combination of C. I. Pigment Green #36 and C. I. Pigment Yellow #139 or C. I. Pigment Yellow #83, or a combination of C. I. Pigment Blue #15; 6 or C. I. Pigment Blue #15; 6 and C. I. Pigment Violet #23.

In the present invention, the method of creating a color filter which has a red pigment is not limited to a specific method. The present invention can employ a printing method, an electrodeposition method, or a photolithographic method of forming patterns by using a photoresist. Here, an example of the method will specifically be described in combination with a preferred photo polymeric composition.

The photo polymeric composition for creating a color filter has (a) at least one kind of unsaturated photo polymeric ethylene compounds (monomers) having at least two end ethylene groups and a boiling point of more than 100° C. under normal pressure, (b) a photopolymerization initiator which is activated by illumination of an active electromagnetic wave, (c) an organic high-molecular polymer (binder) having a water-soluble atomic group in part of a side chain, and (d) the aforementioned pigments.

The present invention can be mainly comprised of an unsaturated monomer of addition polymerization, a photopolymerization initiator, and binder, such as those disclosed in U.S. Pat. No. 3,549,367.

The unsaturated monomer of addition polymerization is a compound having at least one unsaturated ethylene group where addition polymerization is possible and also having a boiling point of more than 100° C. under normal pressure. For example, there are polyethylene glycol mono(meth) acrylate, polypropylene glycol mono(meth)acrylate, monofunctional acrylate or methacrylate such as phenoxy ethyl (meth)acrylate, polyethylene glycol di(meth)acrylate, trimethylolethane tri(meth)acrylate, neopenthyl glycol (meth)acrylate, pentaerythritol tri(meth)acrylate, pentaerythritol tetra(meth) acrylate, dipentaerythritol hexa (meth) acrylate, hexandiol (meth)acrylate, trimethlolpropane tri(acryloiloxyprooil)ether, tri(acryloiloxyethyl) isocyanylate, (meth)acrylate after ethylene oxide or propylene oxide is added to multifunctional alcohol such as glycerine or trimethylolethane, urethane acrylates such as those described in PEPA No. 48-41708, PEPA No. 50-6034, and PUPA No. 51-37193, polyester acrylates such as those described in PUPA No. 48-64183, PEPA No. 49-43191, and PEPA No. 52-30490, and multifunctional acrylate or methacrylate such as epoxyacrylates which are the reaction products of epoxy resin and (meth)acrylic acid.

Furthermore, there can also be used the compounds introduced as a photo-hardened monomer or oligomer in Japan Adhesion Journal Vol. 20, pp 300–308.

The aforementioned monomer or oligomer may be used alone or a plurality of kinds may be mixed and used.

The quantity of these compounds that are used is 5 to 50 weight % with respect to the solid component of a photo polymeric composition, preferably 10 to 40 weight %.

As a photopolymerization initiator, at least one kind of triholomethyl compounds can be used, and it can be used together with the following materials. There is a pycynal polyketoaldonyl compound disclosed in U.S. Pat. No. 2,367,660, an α-carbonyl compound disclosed in U.S. Pat. No. 2,367,661 and U.S. Pat. No. 2,367,670, an acyloin ether compound disclosed in U.S. Pat. No. 2,448,828, an aromatic acyloin compound replaced with an α-hydrocarbon disclosed in U.S. Pat. No. 2,722,512, a multinuclear quinone compound disclosed in U.S. Pat. No. 3,046,127 and U.S. Pat. No. 2,951,758, a combination of a triallylimidazoldaimer and a p-aminophenylketone disclosed in U.S. Pat. No. 3,549,367, and an oxysadiazol compound disclosed in U.S. Pat. No. 4,212,976. It is suitable that the quantity of a triholomethyl compound which is used is about 0.2 to 20 weight % at a solid component ratio to a monomer, preferably 0.5 to 15 weight %.

The ratio of a compound that is used together with a triholomethyl compound is 10 to 800 weight % with respect to the triholomethyl compound, preferably 20 to 300 weight %. It is preferable that a binder be a linear organic high-molecular polymer which is soluble to a monomer and that the binder be soluble to an organic solvent and can be developed with a weak alkaline aqueous solution. As such a linear organic high-molecular polymer, there is a polymer having carboxylic acid at a side chain, such as a methacrylic copolymer, an acrylic copolymer, an itaconic copolymer, a crotonic copolymer, a maleic copolymer, and a partly esterified maleic copolymer, described in PUPA No. 59-44615, PEPA No. 54-34327, PEPA No. 58-12577, PEPA No. 54-25957, PUPA No. 59-53836, and PUPA No. 59-71048. Likewise, there is an acid cellulose derivative having carboxylic acid at a side chain.

In addition, acid anhydrides added to a polymer having a hydroxyl group is useful. Among these, a benzyl(meth)acrylate/(meth)acrylic copolymer and a polyphyletic copolymer of benzyl(meth)acrylate/(meth)acrylic acid/and another monomer are suitable.

Arbitrary quantities of these polymers can be mixed, however, if the quantity exceeds 90 weight % with respect to the solid component of a photo polymeric composition, a satisfactory result will be unobtainable with respect to image intensity. It is preferable that the quantity be 30 to 85 weight %.

Addition of a thermal polymerization inhibitor is generally performed in order to improve storage and stability. For example, hydroloquinone, p-methoxyphenol, di-tert-butyl-p-cresol, pyrogallol, tert-butyl catechol, benzoquinone, 4,4'-thiobis (3-methyl-6-tert-butylphenol), 2,2'-methylene (4-methyl-6-tert-butylphenol), 2-mercaptobenzimidazole, etc., are useful. Usually, about 500 to 2000 ppm is added to a monomer. In monomers on the market, a suitable amount of thermal polymerization inhibitor is usually added.

In the case where a photo polymeric composition that can be employed in the present invention is used as the base of a color filter and a color filter pigment dispersing solution is manufactured, pigments are dispersed into the aforementioned photo polymeric composition by using a dispersing machine such as a roll mill, a sand mill, or a ball mill. Carbon black or black obtained by mixing colors is dispersed, and these dispersed blacks can be used as black stripes.

As a substrate and a support body, transparent material such as glass is frequently employed. Also, in order to enhance adhesive force between, a substrate, a support body, and a composition, various silane coupling agents on the market may be added to the composition, or the composition may be coated after silane coupling agents are added to the substrate and support body.

Spinners, roll coaters, bar coaters, or curtain coaters are employed as a method of applying a coupling agent to a substrate and/or a support body.

As a light source that is used for exposure, a ultra-high pressure mercury lamp is usually used.

As a suitable developing solution, there are water solutions of hydroxide or carbonate of alkaline metal or alkaline earth metal, hydrogen carbonate, aqueous ammonia, alkanoramine, and 4-class ammonium salt. Also, a suitable quantity of interfacial active agent can be added to the aforementioned solution and used.

DETAILED DESCRIPTION OF THE INVENTION

The present invention will hereinafter be described in further detail based on embodiments, but the invention is not limited to the embodiments.

EMBODIMENT 1

| | |
|---|---|
| benzylmethacrylate/methacrylic copolymer (mole ratio 70/30, average molar weight Mw 20000) | 12g |
| C.I. Pigment Red #177 | 7.5g |
| C.I. Pigment Red #224 | 7.5g |
| propylene glycol monomethyl ether acetate | 20g | are mixed by three roll mills.

| | |
|---|---|
| propylene glycol monomethyl ether acetate | 50g |
| 3-etoxypropiolic ethyl | 50g | are added to the aforementioned mixture and primary dispersion is performed by a sand grinder (super mill: Inoue Co.). Next, secondary dispersion is performed by glass beads having an average particle diameter of 1 mm and a DAINO mill (Shinmaru Enterprise Co.)

After dispersion, rough particles, such as broken pieces of glass beads, are filtered with a filter having a hole diameter of 5 $\mu$m, and the following components are added to obtain the composition of the present invention.

| | |
|---|---|
| dipenta erythtol penta acrylate | 40parts |
| 4-[o-bromo-p-N, N-di(ethoxycarbonyl) aminophenyl]2,6-di(trichloromethyl)—S—triazine | 3parts |
| 7-[{4-chloro-6-(diethylamino)—S—triazine-2-il} amino]-3-phenycoumalin | 2parts |
| hydrokinon monomethylether | 0.01part |
| propylene glycol monomethyl ether acetate | 200parts |

Particle sizes were measured with a microtrack UPA particle size analyzer (Nikkiso Co.) utilizing lazer dispersion. The average particle diameter was 0.06 $\mu$m and particles less than 0.1 $\mu$m were 92% of all particles.

This composition was coated on a glass substrate for a color filter by a spin coater and was dried for 2 minutes at 100° C. As a consequence, a uniform film of red was obtained.

An exposure of 200 mj/cm$^2$ was illuminated through a mask by using a ultra-high pressure mercury lamp of 2.5 Kw. Then, the film was immersed into a 0.25% sodium carbonate water-solution and developed. The obtained color filter was measured with an MCPD-1000 spectroscopes (Otsuka Electron Co.). The transmittance in a region of 450 to 500 NM was less than 0.3% at a film of thickness 2 μm and less than 2% at a film of thickness 1.4 μm.

COMPARATIVE EXAMPLE 1

A color filter was made in the same way as the aforementioned embodiment 1, except that the C.I. Pigment Red #224 employed in the embodiment 1 was replaced with C.I. Pigment Yellow #139 and that a ratio of addition was changed to Red #177: 10.5 parts/Yellow #139: 4.5 parts, and the transmittance was evaluated.

For the obtained color filter, the transmittance in a region of 450 to 500 NM was less than 0.5% at a film of thickness 2 μm and about 3% at a film of thickness 1.4 μm.

Figure 3:
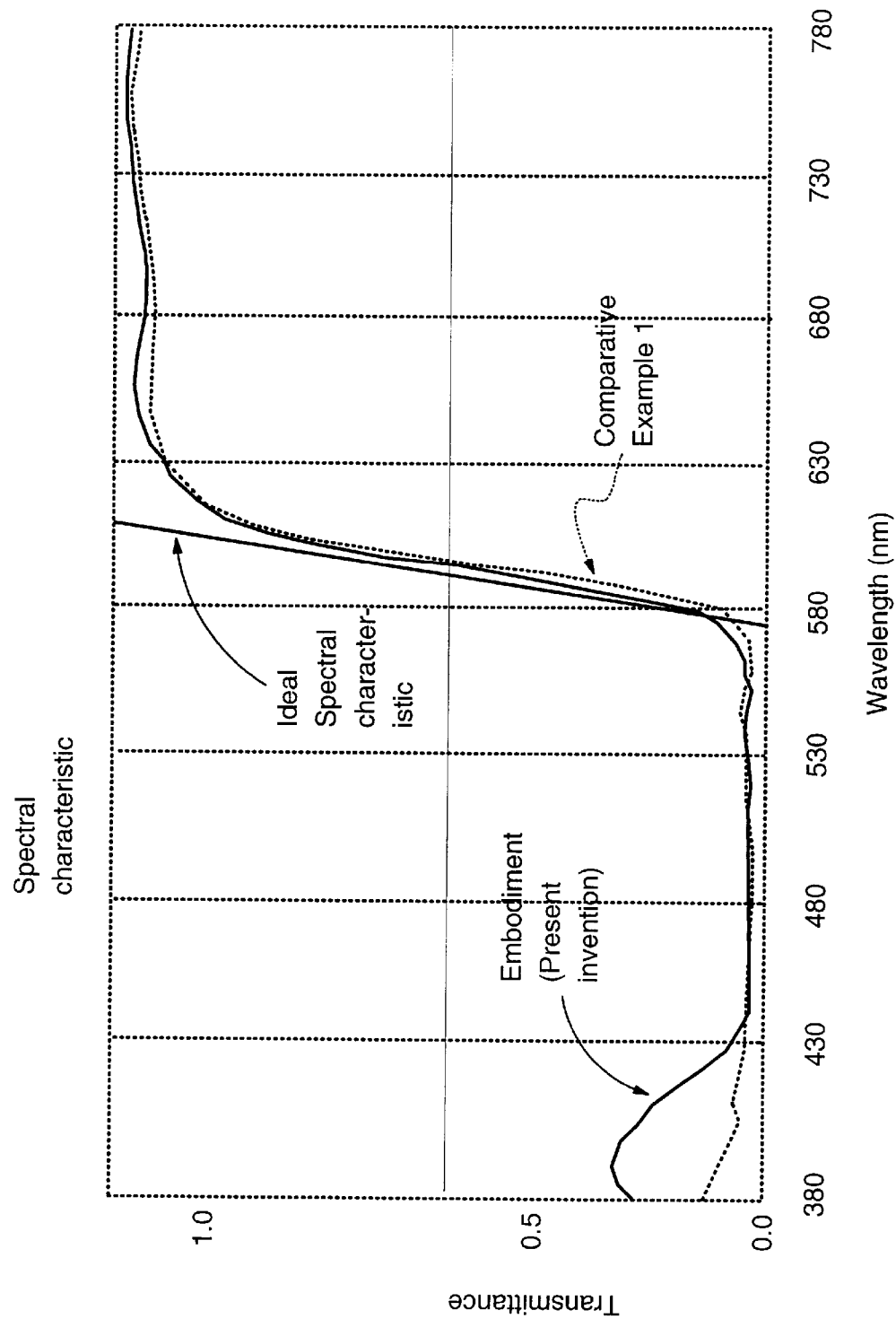
FIG. 3 is a diagram showing a graph representative of the transmitted spectral transmittances of the color filters of an embodiment of the present invention and a comparative example.

Furthermore, the blending of the two pigments employed in the embodiment 1 and comparative example 1 was adjusted so that they become the same chromaticity on TFT MDL FOS (Front of Screen). At that time, the lightness of the light transmitted through each color filter was evaluated and compared. The results of chromaticity and lightness are shown in Table 1, and the transmitted spectra of the embodiment 1 and comparative example 1 are shown in FIG. 3.

TABLE 1

|  | x | y | Y |
|---|---|---|---|
| Test 1 |  |  |  |
| Embodiment 1 | 0.528 | 0.359 | 12.799 |
| Comparative Example 1 | 0.528 | 0.359 | 11.781 |
| Degree of enhancement in the lightness of Embodiment 1 |  |  | 108.5% |
| Test 2 |  |  |  |
| Embodiment 1 | 0.616 | 0.34 | 8.056 |
| Comparative Example 1 | 0.616 | 0.34 | 7.623 |
| Degree of enhancement in the lightness of Embodiment 1 |  |  | 105.7% |

As shown in Table 1, in either case the lightness Y (transmittance) of the color filter of the embodiment of the present invention was enhanced 6 to 9%. As also evident in the spectra shown in FIG. 3, it can be observed that the transmittance of the color filter of the embodiment of the present invention is higher than that of the comparative example in a high wavelength region of more than 640 NM (at first sight of FIG. 3, it seems that there is a little difference in transmittance, but there is a sufficient difference as compared with the comparative example), and it is found that the color filter of the present invention is closer to an ideal red color.

ADVANTAGES OF THE INVENTION

According to the present invention, the transmitted spectrum with respect to the emitted and transmitted spectra of the constituents of a TFT-LCD module is optimized, the maximum transmittance at the panel display surface is realized, and the display quality is enhanced. More specifically, a color filter and a photo polymeric composition, with an improved transmittance or transparency of a red region and an improved color purity, can be provided.

What is claimed is:

1. A color filter for liquid crystal displays, including a red colored layer comprising a first red pigment having a 40%-transmittance wavelength at a short-wave end of a transmitted spectrum (short-wave 40%-transmittance wavelength) within a range of 550 to 600 NM, and at least one second red pigment having said short-wave 40%-transmittance wavelength within 40 NM from said short-wave 40%-transmittance wavelength of said first red pigment, so that transmittance of said red colored layer in a wavelength region of 450 to 500 NM is substantially 0%.

2. The color filter for liquid crystal displays as set forth in claim 1, wherein at wavelengths of less than 450 NM said red colored layer does not block light.

3. A photo polymeric composition comprising:

(a) at least one kind of unsaturated photo polymeric ethylene compounds having at least two terminal ethylene groups and a boiling point of more than 100° C. under normal pressure;

(b) a photopolymerization initiator which is activated by illumination of an active electromagnetic wave;

(c) an organic high-molecular polymer having a water-soluble atomic group in part of a side chain;

(d) pigments;

wherein a red pigment of said pigments (d) comprises a first red pigment having a 40%-transmittance wavelength at a short-wave end of a transmitted spectrum (short-wave 40%-transmittance wavelength) within a range of 550 to 600 NM, and at least one second red pigment having said short-wave 40%-transmittance wavelength within 40 NM from said short-wave 40%-transmittance wavelength of said first red pigment, so that the overall transmittance in a wavelength region of 450 to 500 NM of is substantially 0%.

* * * * *